(12) United States Patent
Ono et al.

(10) Patent No.: US 10,162,575 B2
(45) Date of Patent: Dec. 25, 2018

(54) SYSTEM, SERVER DEVICE, AND INFORMATION PROCESSING APPARATUS

(71) Applicant: FUJI XEROX CO., LTD., Tokyo (JP)

(72) Inventors: Masafumi Ono, Kanagawa (JP); Keita Sakakura, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 54 days.

(21) Appl. No.: 15/485,436

(22) Filed: Apr. 12, 2017

(65) Prior Publication Data

US 2018/0032287 A1    Feb. 1, 2018

(30) Foreign Application Priority Data

Jul. 26, 2016   (JP) .................... 2016-146829

(51) Int. Cl.
*G06F 3/12*       (2006.01)
*G06Q 10/10*      (2012.01)
*H04N 1/00*       (2006.01)

(52) U.S. Cl.
CPC ............ *G06F 3/1205* (2013.01); *G06F 3/126* (2013.01); *G06F 3/1267* (2013.01); *G06F 3/1285* (2013.01); *G06Q 10/10* (2013.01); *H04N 1/00127* (2013.01)

(58) Field of Classification Search
CPC .................................................. G06F 3/1205
See application file for complete search history.

(56) References Cited

U.S. PATENT DOCUMENTS

| | | | | |
|---|---|---|---|---|
| 7,016,617 B2* | 3/2006 | Koike | .................... | G06Q 30/02 |
| | | | | 358/1.15 |
| 2003/0112460 A1* | 6/2003 | Simpson | ............... | G06F 3/1205 |
| | | | | 358/1.15 |
| 2009/0086257 A1* | 4/2009 | Harrington | ........ | H04N 1/00931 |
| | | | | 358/1.15 |
| 2009/0217305 A1* | 8/2009 | Kato | .................... | G06F 21/608 |
| | | | | 719/321 |
| 2009/0234878 A1* | 9/2009 | Herz | .................... | G06Q 20/383 |
| 2015/0193673 A1* | 7/2015 | Park | .................... | G06F 3/1213 |
| | | | | 358/1.15 |

FOREIGN PATENT DOCUMENTS

| | | |
|---|---|---|
| JP | 2002-014899 A | 1/2002 |
| JP | 2006-301806 A | 11/2006 |

* cited by examiner

*Primary Examiner* — King Poon
*Assistant Examiner* — Michael Burleson
(74) *Attorney, Agent, or Firm* — Sughrue Mion, PLLC

(57) ABSTRACT

A system includes
plural output units that output received document data,
a storage unit that stores attribute information of a recipient who is to output the document data,
a specifying unit that specifies an output unit from among the plural output units by using the attribute information of the recipient; and
a transmitting unit that transmits the document data to the output unit specified by the specifying unit.

12 Claims, 13 Drawing Sheets

FIG.7A

| NAME | ADDRESS | POSTAL CODE | USING STATION | AGE | GEN-DER | ACADEMIC HISTORY | HOSPITAL HISTORY | HOBBY | DESIGNATED MACHINE IDENTIFICATION INFORMATION | DESIGNATED MACHINE INSTALLATION ADDRESS | CONVENIENCE STORE USE FREQUENCY | ... |
|---|---|---|---|---|---|---|---|---|---|---|---|---|
| AAA | ○METRO. ○DISTRICT○ | ○-○ | ○TRAIN ○STATION | ○ | M | COLLEGE GRADUATE | ○○○ | ○ | MFP0123 | ○METRO. ○DISTRICT○ | HIGH | ... |
| BBB | ×METRO.×CITY× | ×-× | ×TRAIN ×STATION | × | F | ELEMENTARY SCHOOL GRADUATE | ××× | × | MFP4567 | ×METRO.×CITY× | MEDIUM | ... |
| CCC | △PREFECTURE △TOWN△ | △-△ | △TRAIN △STATION | △ | M | HIGH SCHOOL GRADUATE | △△△ | △ | MFP8910 | △PREFECTURE △TOWN△ | LOW | ... |
| ... | ... | ... | ... | ... | ... | ... | ... | ... | ... | ... | ... | ... |

FIG.7B

| ORGANIZATION NAME | ADDRESS | POSTAL CODE | NEARBY STATION | BUSINESS TYPE | NUMBER OF EMPLOYEES | DESIGNATED MACHINE IDENTIFICATION INFORMATION | ... |
|---|---|---|---|---|---|---|---|
| ○ CO., LTD. | ○METRO. ○DISTRICT○ | ○-○ | ○TRAIN ○STATION | ○○ | ○ | MFP0198 | ... |
| × TRADING COMPANY | ×METRO.×CITY× | ×-× | ×TRAIN ×STATION | ×× | × | MFP7654 | ... |
| △OFFICE | △PREFECTURE △TOWN△ | △-△ | △TRAIN △STATION | △△ | △ | MFP2210 | ... |
| ... | ... | ... | ... | ... | ... | ... | ... |

FIG.7C

| MACHINE IDENTIFICATION INFORMATION | INSTALLATION ADDRESS | POSTAL CODE | NEARBY STATION | INSTALLATION ENVIRONMENT | USER INFORMATION | USE FREQUENCY | ... |
|---|---|---|---|---|---|---|---|
| MFP0001 | ○METRO, ○DISTRICT○ | ○-○ | ○TRAIN STATION | OFFICE | COMPANY EMPLOYEE | MEDIUM | ... |
| MFP0002 | ×METRO, ×CITY× | ×-× | ×TRAIN STATION | CONVENIENCE STORE | UNSPECIFIED PERSON | HIGH | ... |
| MFP0003 | △PREFECTURE △TOWN△ | △-△ | △TRAIN STATION | PUBLIC INSTITUTION | UNSPECIFIED PERSON | HIGH | ... |
| MFP0004 | □PREFECTURE □CITY× | □-□ | □TRAIN STATION | PRIVATE RESIDENCE | INDIVIDUAL | LOW | ... |
| ... | ... | ... | ... | ... | ... | ... | ... |

US 10,162,575 B2

SYSTEM, SERVER DEVICE, AND INFORMATION PROCESSING APPARATUS

CROSS-REFERENCE TO RELATED APPLICATIONS

This application is based on and claims priority under 35 USC 119 from Japanese Patent Application No. 2016-146829 filed Jul. 26, 2016.

BACKGROUND

Technical Field

The present invention relates to a system, a server device, and an information processing apparatus.

SUMMARY

According to an aspect of the invention, a system includes plural output units that output received document data, a storage unit that stores attribute information of a recipient who is to output the document data, a specifying unit that specifies an output unit from among the plural output units by using the attribute information of the recipient; and a transmitting unit that transmits the document data to the output unit specified by the specifying unit.

BRIEF DESCRIPTION OF THE DRAWINGS

Exemplary embodiments of the present invention will be described in detail based on the following figures, wherein:

FIG. 7A is an example of registrant attribute information for an individual;

FIG. 7B is an example of registrant attribute information for a company;

FIG. 7C is an example of machine attribute information;

DETAILED DESCRIPTION

Hereinafter, exemplary embodiments of the present invention will be described with reference to the accompanying drawings.

<Exemplary Embodiment 1>

[System Configuration]

Figure 1:
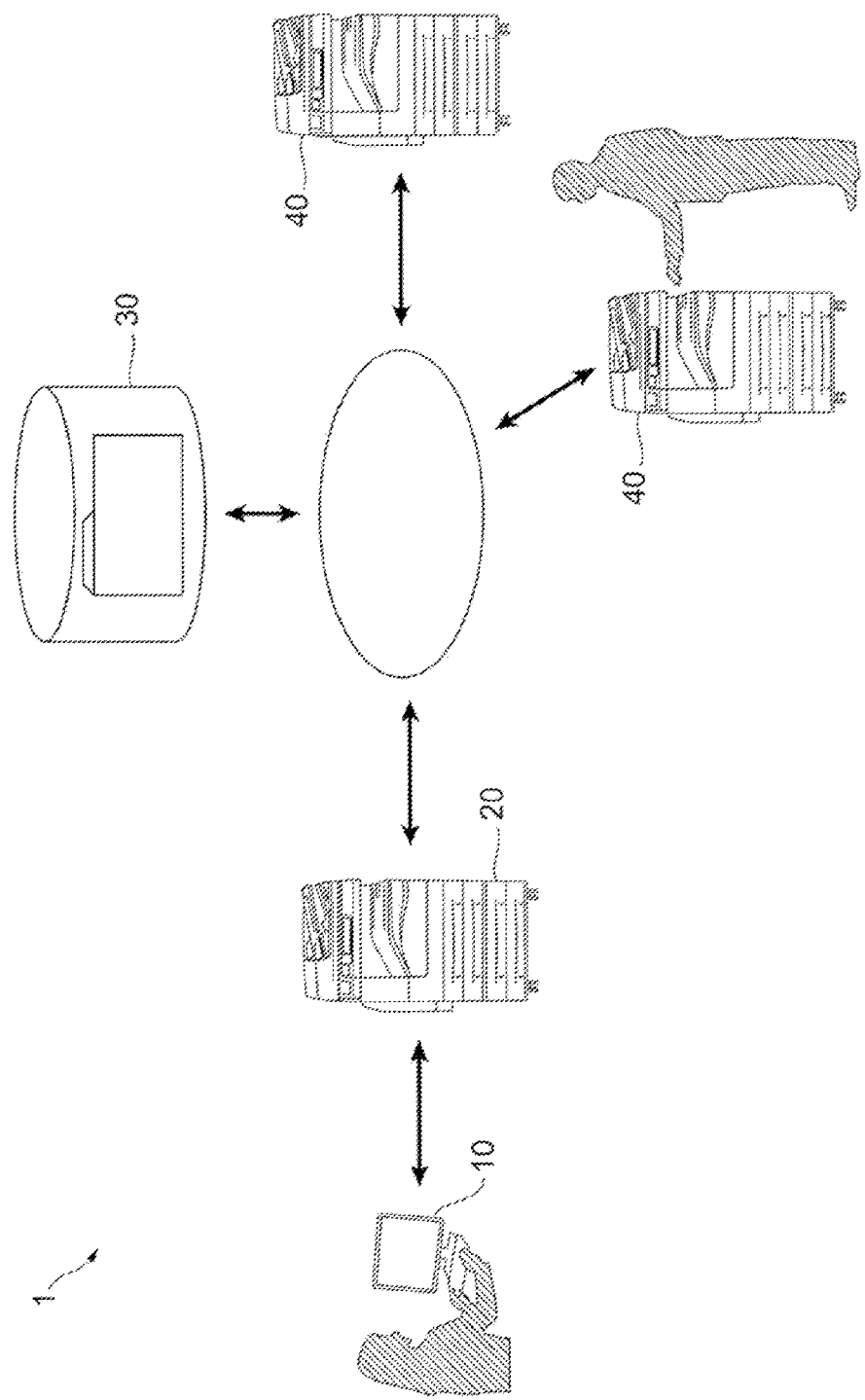
FIG. 1 is a view illustrating an exemplary configuration of a document transmitting/receiving system of an exemplary embodiment 1.

FIG. 1 is a view illustrating an exemplary configuration of a document transmitting/receiving system to which an exemplary embodiment 1 is applied.

As illustrated in FIG. 1, a document transmitting/receiving system 1 of the exemplary embodiment 1 includes a terminal device 10, a first image processing apparatus 20, a management server 30, and plural second image processing apparatuses 40. The terminal device 10, the first image processing apparatus 20, the management server 30, and the second image processing apparatuses 40 are data-connected to each other directly or through a network.

In the document transmitting/receiving system 1 of the exemplary embodiment 1, a sender transmits a document from the first image processing apparatus 20 to one of the second image processing apparatuses 40 through the terminal device 10. Specifically, the sender first creates a document by using the terminal device 10. The created document is transmitted from the first image processing apparatus 20 to the second image processing apparatus 40 via the management server 30. Then, the document is printed on paper in the second image processing apparatus 40 and received by a recipient.

As described above, in the document transmitting/receiving system 1 of the exemplary embodiment 1, the first image processing apparatus 20 functions like a mailbox in which a sender puts a mail, and the second image processing apparatus 40 functions like a mailbox at which a recipient receives the mail. In addition, the document transmitting/receiving system 1 implements an electronic postal service (hereinafter, referred to as the "present service") of transmitting and receiving a document through the plural image processing apparatuses. In the present service, a recipient may receive a document from any of the plural second image processing apparatuses 40 installed at any places.

In the document transmitting/receiving system 1 of the exemplary embodiment 1, a sender collectively sends a direct mail (e.g., a document such as an advertisement) to plural recipients. Especially, in the present service for sending the direct mail, the sender may send a document to the recipients who are destinations, without designating, for example, an address of each of the recipients.

The sending of the direct mail will be described in detail later.

In addition, in the exemplary embodiment 1, the second image processing apparatus 40 functions as an output unit, and the management server 30 functions as an example of a storage unit (a memory), a specifying unit (a specifying section), a transmitting unit (a transmitting section), and a fee charging unit. The terminal device 10 functions as a receiving unit.

In the exemplary embodiment 1, a document refers to a document written with information that may be recognized by a perception of a person such as characters, signs, and images. In addition, document data includes letter data that becomes a letter when the letter data is printed on paper. Here, the letter refers to a document presenting a sender's will or notifying a fact to a specific recipient.

Examples of the letter may include an official letter, an invoice, a seal registration certificate, a copy of a resident's card, and a direct mail written with a recipient's name.

Examples of documents other than the letter may include a catalog and a direct mail written with no recipient's name.

In addition, the document created by the sender is kept the same in contents but a data format thereof changes until the recipient receives the document. In the descriptions hereinafter, for convenience of descriptions, a document as electronic data may be generally referred to as "document data," regardless of the data format of the document. In addition, a printout which is obtained by printing the document data on paper or the like will be referred to as a "paper printing document."

At this time, the first image processing apparatus 20 and the second image processing apparatus 40 are identical to each other in basic configuration. In the descriptions hereinafter, the first image processing apparatus 20 is a machine used when a sender sends a document (hereinafter, referred to as a "sender side machine"). Meanwhile, the second image processing apparatus 40 is a machine used when a recipient receives a document (hereinafter, referred to as a "recipient side machine").

Here, the second image processing apparatus 40 may be the sender side machine, and the first image processing apparatus 20 may be the recipient side machine. However, when all the cases where any one of the first image processing apparatus 20 and the second image processing apparatus 40 is the sender side machine, and the other is the recipient side machine are described, the functional configurations will overlap with each other thereby causing descriptions of the functional configurations to be complicated. Hence, descriptions will be made assuming that the first image processing apparatus 20 is the sender side machine, and the second image processing apparatus 40 is the recipient side machine.

The terminal device 10 creates the document data with a predetermined application or the like through an operation by the sender. The terminal device 10 sends the created document data to the first image processing apparatus 20. As the terminal device 10, for example, an installed personal computer (PC) or a portable terminal such as a mobile phone or a tablet terminal may be used.

The first image processing apparatus 20 is a so-called multifunction machine and has functions such as copying, printing (image forming), image reading, and faxing. Further, the first image processing apparatus 20 has a function to transmit the document data created by the sender and relevant information related to the transmission of the document data to the management server 30, as one of the functions to implement the present service.

The management server 30 stores the document data and the relevant information related to the transmission/reception of the document data which are acquired from the first image processing apparatus 20. Then, the management server 30 transmits the stored document data to the second image processing apparatus 40 based on an instruction from the recipient.

The second image processing apparatus 40 is a so-called multifunction machine and has functions such as copying, printing (image forming), image reading, and faxing. Further, the second image processing apparatus 40 prints the document data received from the management server 30, as one of the functions to implement the present service.

[Exemplary Hardware Configuration]

Figure 2:
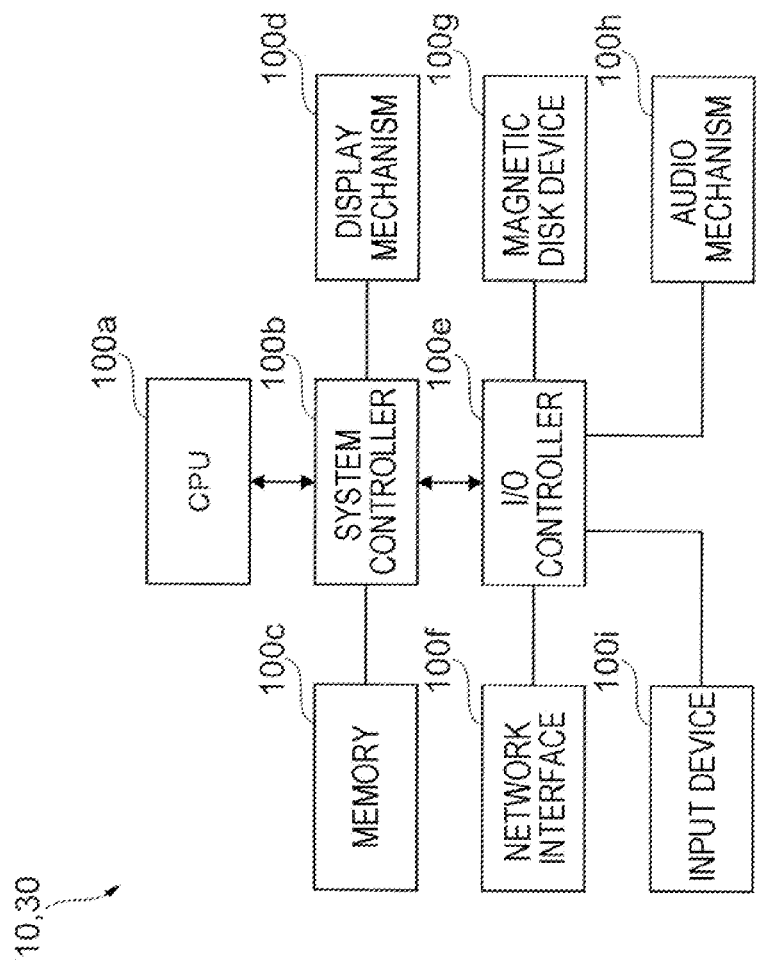
FIG. 2 is a view illustrating an exemplary hardware configuration of a terminal device and a management server.

FIG. 2 is a view illustrating an exemplary hardware configuration of the terminal device 10 and the management server 30.

As illustrated in FIG. 2, each of the terminal device 10 and the management server 30 includes a central processing unit (CPU) 100*a* as an arithmetic operation unit and a memory 100*c* as a main memory. Further, each of the terminal device 10 and the management server 30 includes, for example, a magnetic disk device (hard disk drive (HDD)) 100*g*, a network interface 100*f*, a display mechanism 100*d*, an audio mechanism 100*h*, and an input device 100*i* such as a keyboard or a mouse, as external devices.

The memory 100*c* and the display mechanism 100*d* are connected to the CPU 100*a* through a system controller 100*b*. In addition, the network interface 100*f*, the magnetic disk device 100*g*, the audio mechanism 100*h*, and the input device 100*i* are connected to the system controller 100*b* through an I/O controller 100*e*. The components are connected to each other by various buses such as a system bus or an input/out bus.

The magnetic disk device 100*g* stores a program to implement each of the functions. The program is loaded to the memory 100*c*, and processing based on the program is performed by the CPU 100*a* so that the various functions are implemented.

[Hardware Configuration of First Image Processing Apparatus 20 and Second Image Processing Apparatus 40]

Figure 3:
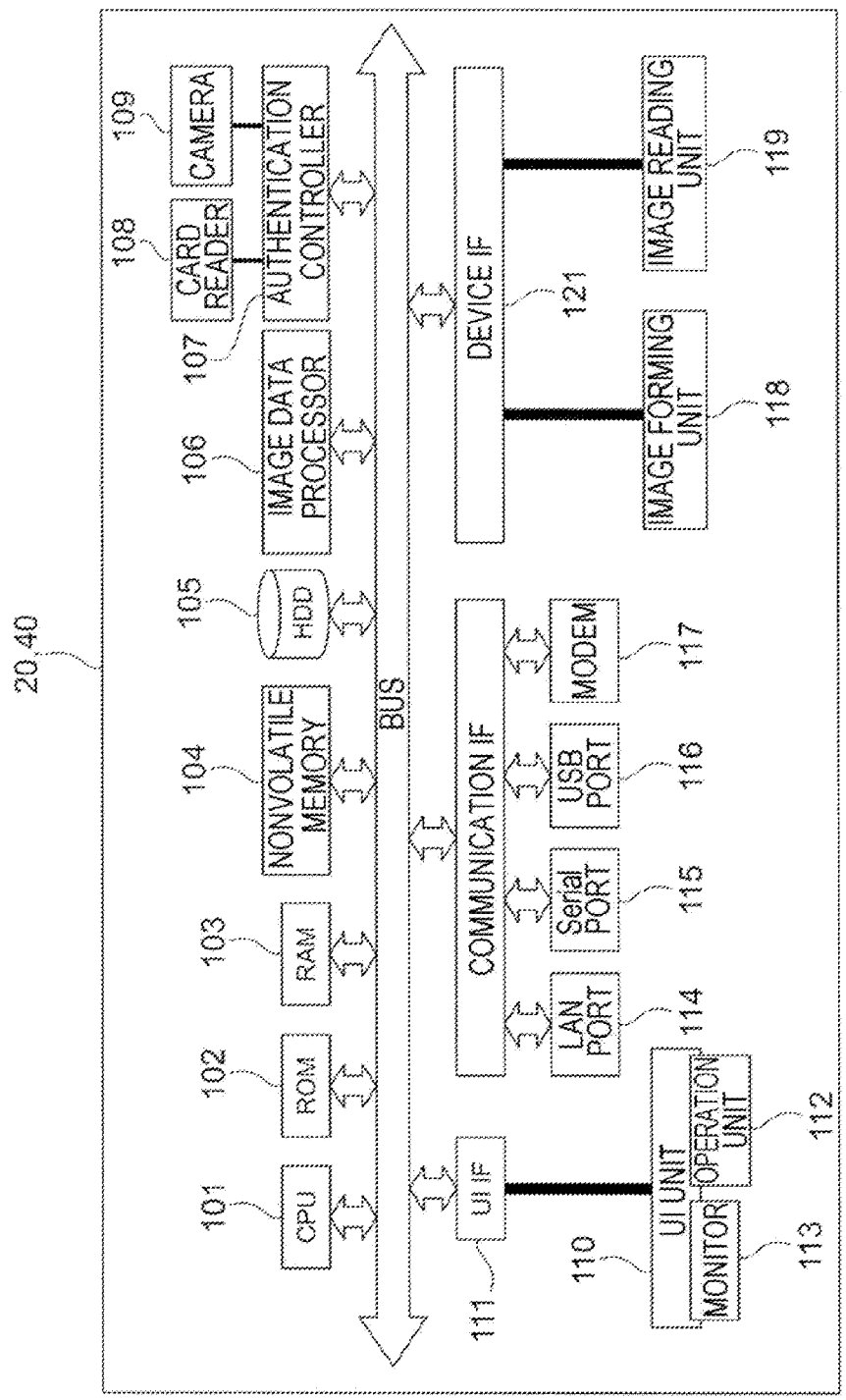
FIG. 3 is a view illustrating an exemplary hardware configuration of a first image processing apparatus and a second image processing apparatus of the exemplary embodiment 1.

FIG. 3 is a view illustrating an exemplary hardware configuration of the first image processing apparatus 20 and the second image processing apparatus 40 of the exemplary embodiment 1.

As illustrated in FIG. 3, a CPU 101 performs a main control of the first image processing apparatus 20 and the second image processing apparatus 40, by loading various programs stored in, for example, a read only memory (ROM) 102 to a random access memory (RAM) 103 and executing the programs, so as to implement the functions of each of the first image processing apparatus 20 and the second image processing apparatus 40. The ROM 102 is a memory that stores, for example, various programs to be executed by the CPU 101 or predetermined fixed data. The RAM 103 is a memory that is used as, for example, a working memory for the CPU 101. A nonvolatile memory 104 is a memory that may hold the stored information even when a power is not supplied, and stores parameters or various history data to be used for an image adjustment.

The HDD 105 is, for example, a magnetic disk device and stores, for example, image data read by an image reading unit 119 or image data to be used for an image formation in an image forming unit 118 to be described later.

An image data processor 106 performs processing for image data such as decompression/compression of image data. An authentication controller 107 controls a card reader 108 and a camera 109. The card reader 108 reads an IC card equipped with an integrated circuit (IC) therein for recording information or performing an arithmetic operation, so as to acquire information recorded in the IC card. In addition, the camera 109 captures an image including a user operating the UI unit 110.

The UI unit 110 includes an operation unit 112 that receives a contact operation by a user and a monitor 113 that displays various images.

The operation unit 112 receives an instruction from a user for image processing functions of each of the first image processing apparatus 20 and the second image processing apparatus 40 such as a printing function, a scanning function, a copying function, a facsimile function, and a document transmitting/receiving function.

A local area network port (LAN) port 114 is an interface for inputting and outputting data with respect to the outside. In the exemplary embodiment 1, the LAN port 114 also functions as a wireless communication interface. A serial port 115 is an interface for a connection of an external peripheral device. A universal serial bus (USB) port 116 is an interface for a connection of a peripheral device through a USB cable. A modem 117 is a controller to be connected to a public line, such as a facsimile, and enables providing various facsimile functions.

The image forming unit 118 forms an image on paper or the like as an example of a recording medium. The image reading unit 119 reads the image recorded on the paper or the like.

Subsequently, the functional configurations of the respective components related to the document transmitting/receiving system 1 will be described in detail.

[Functional Configuration of Terminal Device 10]

In the exemplary embodiment 1, the terminal device 10 is connected to the first image processing apparatus 20. A printer driver is installed in the terminal device 10 to operate the first image processing apparatus 20. The terminal device 10 is configured to enable operating the image forming unit 118 or the image reading unit 119 in the first image processing apparatus 20 or using the present service through the first image processing apparatus 20.

In addition, in the terminal device 10, a sender creates a document file by using, for example, a predetermined application. The document file is data serving as the base for a paper printing document which is to be finally sent to a recipient. Then, the terminal device 10 converts the document file created by the sender into page-description language (PDL) data. In addition, the terminal device 10 transmits the PDL data to the first image processing apparatus 20.

[Functional Configuration of First Image Processing Apparatus 20]

Figure 4:
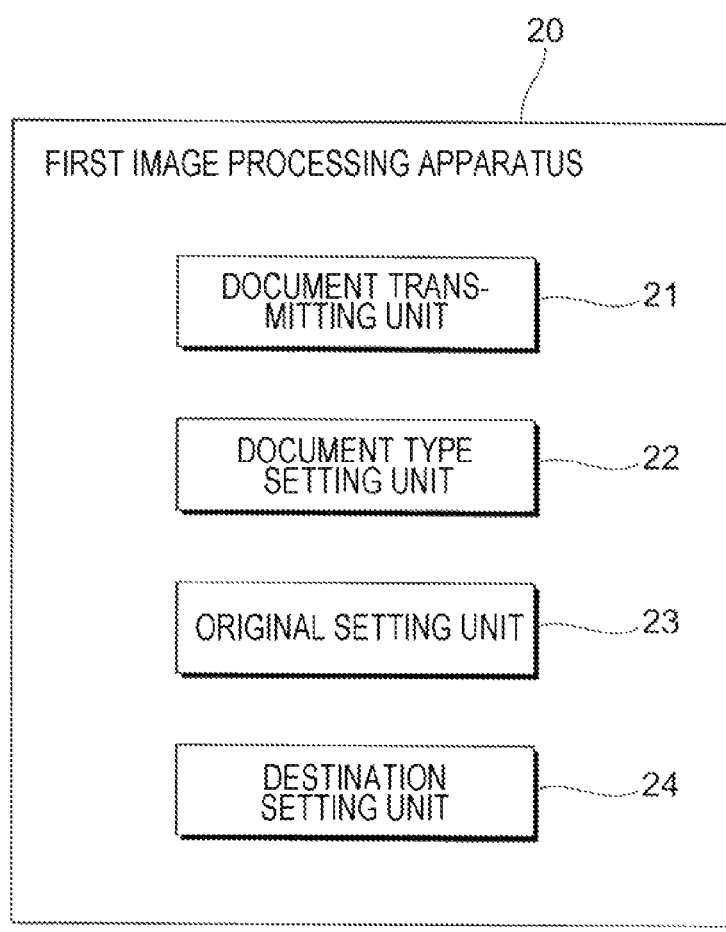
FIG. 4 is a functional block diagram of the first image processing apparatus of the exemplary embodiment 1.

FIG. 4 is a functional block diagram of the first image processing apparatus 20 of the exemplary embodiment 1.

As illustrated in FIG. 4, the first image processing apparatus 20 includes a document transmitting unit 21 that transmits a document image, a document type setting unit 22 that sets a type of a document, an original setting unit 23 that assures the originality, and a destination setting unit 24 that sets a destination to which document data is to be transmitted.

The document transmitting unit 21 creates a document image (an image file) based on the PDL data of the document acquired from the terminal device 10. Then, the document transmitting unit 21 transmits the created document image to the management server 30.

The document type setting unit 22 sets transmission/reception types of the document. In the exemplary embodiment 1, the transmission/reception types include "ordinary transmission/reception," "time-limited transmission/reception," and "direct mail transmission/reception."

The "ordinary transmission/reception" is ordinary transmission/reception other than the time-limited transmission/reception and the direct mail transmission/reception. The "time-limited transmission/reception" is transmission/reception for which an expiration period is set in which a recipient is permitted to output (print) the document image in the ordinary format (hereinafter, referred to as a "printing time limit").

The "direct mail transmission/reception" is a transmission of a document image including promotional contents such as product information and catalogs, to plural target recipients.

Here, the transmission/reception types may be combined with each other. For example, a document image may be transmitted in a combination of the "time-limited transmission/reception" and the "direct mail transmission/reception."

The original setting unit 23 performs an original setting for a paper printing document to assure that the paper printing document is the original. When receiving an instruction from the sender to perform the original setting for a paper printing document, the original setting unit 23 transmits original setting information which is instruction information for the original setting, to the management server 30.

The destination setting unit 24 sets destination information which is information of the recipient of the document. Then, the destination setting unit 24 transmits the destination information in association with the document image, to the management server 30.

At this time, the destination of the document image is not limited to a specific individual, and a company or a specific department of a company may be set as a destination. In addition, the destination setting unit 24 may directly select the recipient side machine by using information that may designate a specific image processing apparatus connected to a network, and transmit the document image to the recipient side machine as a destination.

In addition, in a case where the direct mail is set as the transmission/reception type, the destination setting unit 24 receives conditions for setting recipients or recipient side machines from the sender. Then, the destination setting unit 24 transmits the conditions of the recipients or the recipient side machines in association with the direct mails, to the management server 30.

Subsequently, descriptions will be made on a send screen displayed on the display mechanism 100d of the terminal device 10 connected to the first image processing apparatus 20 when a document image is transmitted from the first image processing apparatus 20.

Figure 5A:
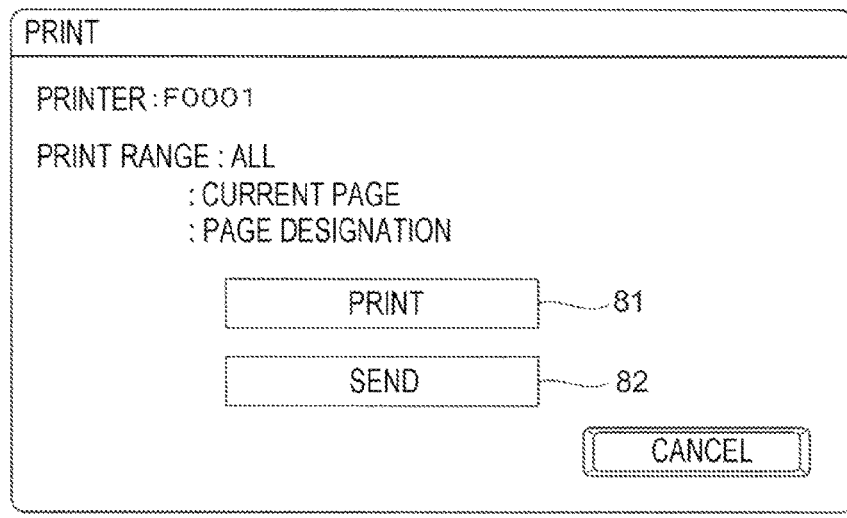
FIGS. 5A and 5B are views of an exemplary document send screen of the exemplary embodiment 1.
Figure 5B:
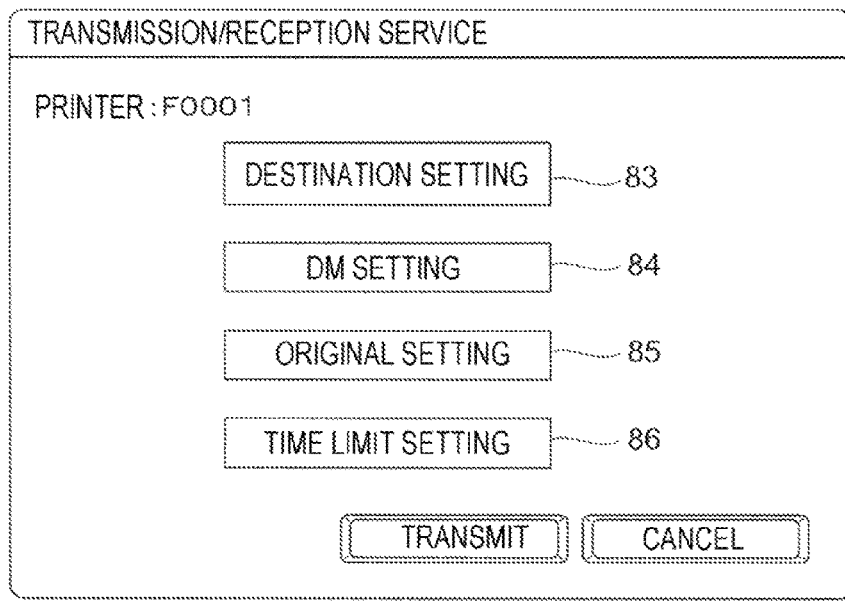

FIGS. 5A and 5B are views of an example of the document send screen of the exemplary embodiment 1.

For example, a screen for performing printing in the first image processing apparatus 20 is opened from an operation menu of the application of the terminal device 10. Then, as illustrated in FIG. 5A, the screen displays a print button 81 and a send button 82. The print button 81 is a button for printing the document image in the first image processing apparatus 20. Meanwhile, the send button 82 is a button for sending the document to the recipient through the first image processing apparatus 20.

Then, when the send button 82 is selected, the send screen for sending the document is displayed as illustrated in FIG. 5B. The send screen includes a destination setting button 83 for setting a destination, a DM setting button 84 for setting a document image to a direct mail, an original setting button 85 for performing an original setting for a paper printing document, and a time limit setting button 86 for setting a printing time limit (an example of an output time limit) of a document image.

The destination setting button 83 is used to set a recipient or a recipient side machine. When the destination setting button 83 is pressed, a list of recipient names is displayed. Then, the sender designates a recipient name to which the document is to be transmitted.

The DM setting button 84 is used to set the direct mail transmission/reception for a document image which is an object to be transmitted. When the DM setting button 84 is pressed, the screen transitions to a condition setting screen for setting a recipient.

Here, the condition setting screen will be described in detail later.

The original setting button 85 is used to perform an original setting for a paper printing document based on the document to be transmitted. When the original setting button 85 is pressed, original setting information for performing a setting to assure the originality of a paper printing document is transmitted to the first image processing apparatus 20.

The time limit setting button 86 is used to set a printing time limit for document data which is an object to be transmitted. When the time limit setting button 86 is pressed, a predetermined input screen is displayed, and time limit information such as a date and time is received.

[Functional Configuration of Management Server 30]

Figure 6:
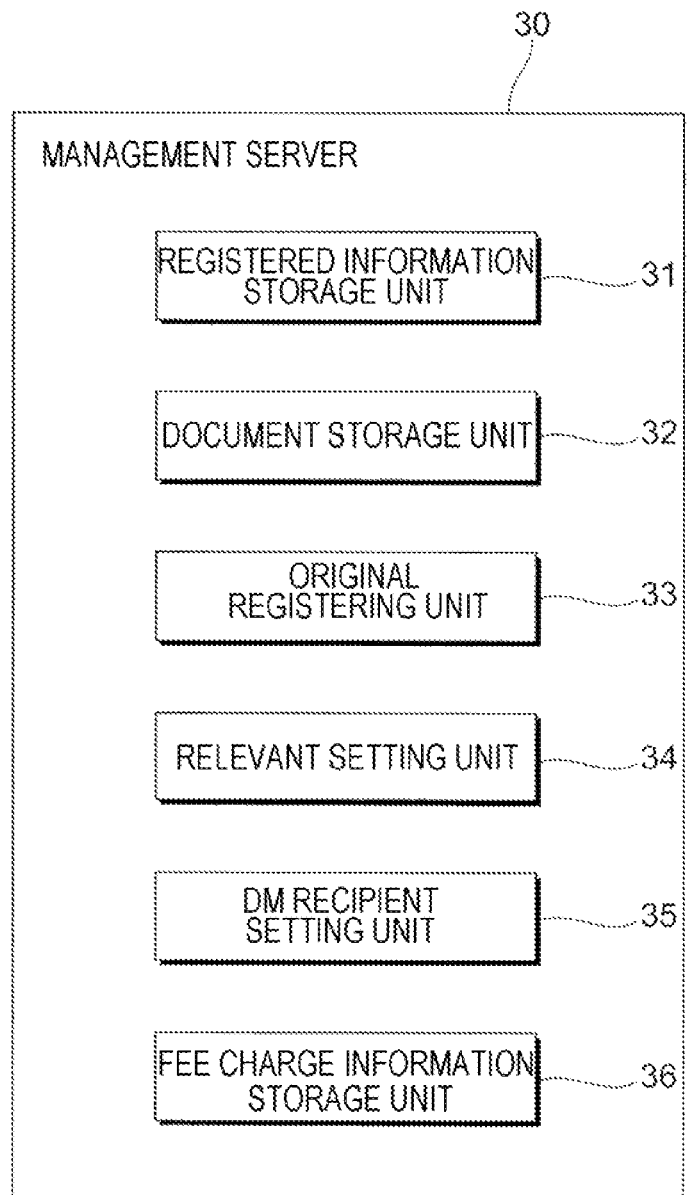
FIG. 6 is a functional block diagram of the management server of the exemplary embodiment 1.

FIG. 6 is a functional block diagram of the management server 30 of the exemplary embodiment 1.

As illustrated in FIG. 6, the management server 30 includes a registered information storage unit 31 that stores registered information for use of the present service, a document storage unit 32 that stores the document image, an original registering unit 33 that registers the originality of a paper printing document, a relevant setting unit 34 that performs a setting related to a type of transmission/reception, a DM recipient setting unit 35 that sets a destination of a direct mail, and a fee charge information storage unit 36 that stores information of fee charge for transmission/reception.

The registered information storage unit 31 stores registered information such as a registered name of a service registrant registered for using the present service (e.g., a name of an individual or an organization such as a company), a user ID, and a use password. The registered information storage unit 31 enables the stored registered information to be referred to when a recipient performs a log-in authentication in the second image processing apparatus 40.

In addition, the registered information storage unit 31 stores attribute information of a service registrant. The attribute information is used when a recipient of a direct mail is set, as described later. In the exemplary embodiment 1, the attribute information includes registrant attribute information which is related to a service registrant and machine attribute information which is related to a recipient side machine.

The document storage unit 32 stores the document image received from the first image processing apparatus 20. In addition, the document storage unit 32 stores the destination information of the document in association with the document image. Then, the document storage unit 32 transmits the stored document image to the second image processing apparatus 40 according to a request from the second image processing apparatus 40.

The original registering unit 33 registers the original of the document image for which the original setting has been performed. In order to assure the originality of a paper printing document, the original registering unit 33 stores information that may identify the document image which is the base for a paper printing document and a paper printing document corresponding to the document image. The original registering unit 33 of the exemplary embodiment 1 creates an identification information image to identify that the paper printing document is the original. The identification information image is an image that may uniquely specify the paper printing document. The original registering unit 33 stores the document image and the identification information image in association with each other.

In addition, the original registering unit 33 stores a printing history which is a printing history of the document image in the second image processing apparatus 40. In the exemplary embodiment 1, when a certain document image is printed for the first time, the original registering unit 33 transmits the identification information image corresponding to the document image to the second image processing apparatus 40. At this time, when second or more printings of the document image are performed, the original registering unit 33 does not transmit the corresponding identification information image to the second image processing apparatus 40. That is, in the exemplary embodiment 1, the originality is assured only for the paper printing document which is printed for the first time.

In addition, in assuring the originality of the paper printing document, the identification information image may not be necessarily printed directly on the paper printing document. For example, when the document image is printed, a paper fingerprint of printing paper is read in advance. Then, the original registering unit 33 may store the information of the paper fingerprint in association with the document image so as to manage the originality of the paper printing document.

In addition, the number of the printing times of the paper printing document for assuring the originality is not limited to one time and may be a predetermined number of times.

When the printing time limit is set for the document image, the relevant setting unit 34 stores the printing time limit for the document image. The relevant setting unit 34 permits the document image for which the printing time limit has been set, to be printed before the printing time limit. Meanwhile, the relevant setting unit 34 restricts the document image for which the printing time limit has been set, from being printed after elapse of the printing time limit.

When the direct mail transmission/reception is set, the DM recipient setting unit 35 sets a service registrant meeting a condition set by a sender, as a recipient. Specifically, the DM recipient setting unit 35 acquires setting information of a direct mail from the first image processing apparatus 20. Then, the DM recipient setting unit 35 specifies a user registrant meeting the condition included in the setting information of the direct mail, by referring to the attribute information stored in the registered information storage unit 31. The DM recipient setting unit 35 sets the specified user registrant as a recipient of the direct mail.

In addition, when a direct mail is transmitted/received, the DM recipient setting unit 35 sets a recipient side machine (the second image processing apparatus 40) meeting the condition set by the sender, and sets the service registrant using the recipient side machine as a recipient. Specifically, the DM recipient setting unit 35 acquires the setting information of the direct mail received from the first image processing apparatus 20. Then, the DM recipient setting unit 35 specifies a recipient side machine meeting the condition included in the setting information of the direct mail, by referring to the attribute information stored in the registered information storage unit 31. The DM recipient setting unit 35 sets the user registrant using the specified recipient side machine as a recipient of the direct mail.

The fee charge information storage unit 36 stores information of fee charge to a sender or a recipient which arises from the sending of a document by the sender or the reception of a document by the recipient.

Here, when a recipient outputs the document image, the fee charge information storage unit 36 may charge a fee to the recipient. Especially, in the exemplary embodiment 1, when a sender transmits a direct mail, the fee charge information storage unit 36 sets fees to be charged, according to the number of direct mails printed by the recipient.

FIGS. 7A to 7C are views illustrating an example of the attribute information stored by the registered information storage unit 31.

FIG. 7A is an example of registrant attribute information for an individual, and FIG. 7B is an example of registrant attribute information for a company. FIG. 7C is an example of machine attribute information.

As illustrated in FIG. 7A, the registrant attribute information for an individual includes information registered by an individual who is a service registrant, and related information obtained from the registered information.

The registrant attribute information for an individual includes "area information" related to an area of a service registrant such as an address, a postal code, and a using station. Further, the registrant attribute information for an individual includes "characteristic information" related to characteristics of an individual who is a service registrant, such as an age, the gender, an academic background, a hospital history, a hobby, designated machine identification information, a designated machine installation address, and a convenience store use frequency.

Here, the designated machine identification information is information that may specify a recipient side machine (the second image processing apparatus 40) arbitrarily designated in advance by a service registrant. In the present service, a service registrant may designate in advance a recipient side machine installed in, for example, a convenience store which is on the way to an office or a school and is frequently used by him/her (hereinafter, referred to as a "designated machine"). As described above, the designated machine identification information may specify a machine designated by a service registrant.

In addition, the designated machine installation address is an address of a building where the designated machine is set, such as a convenience store. That is, the designated machine installation address is an address of a place where the designated machine exists.

In addition, a service registrant may use and register a recipient side machine installed in a convenience store near, for example, an office. In this case, for example, the designated machine installation address is different from the actual address area of the service registrant.

The convenience store use frequency is a visit frequency of the service registrant to the convenience store where the designated machine is installed. The convenience store use frequency is specified by, for example, a use frequency of the designated machine or a purchase frequency of products.

As illustrated in FIG. 7B, the registrant information for a company includes "area information" related to an area of a company as a service registrant such as an address, a postal code, and a nearby station. Further, the registrant information for a company includes "characteristic information" related to characteristics of a company as a service registrant such as a business type, the number of employees, and designated machine identification information.

Here, the designated machine identification information is information that may specify a recipient side machine (the second image processing apparatus 40) installed in an office of a company.

As illustrated in FIG. 7C, the machine attribute information includes "machine area information" related to an area of a recipient side machine (the second image processing apparatus 40) capable of using the present service such as an installation address, a postal code, and a nearby station. Further, the machine attribute information includes "machine characteristic information" related to characteristics of a machine such as an installation environment, user information, and a use frequency.

Here, the installation environment is a classified environment where a recipient side machine is installed. The classified installation environment may be, for example, an office, a convenience store, a public institution, or a private residence.

In addition, the user information is a classified type of a service registrant using a recipient side machine. The classified user information may be, for example, a company employee, an individual, or an unspecified person.

In addition, the use frequency is a use frequency of the second image processing apparatus 40 as a recipient side machine.

[Functional Configuration of Second Image Processing Apparatus 40]

Figure 8:
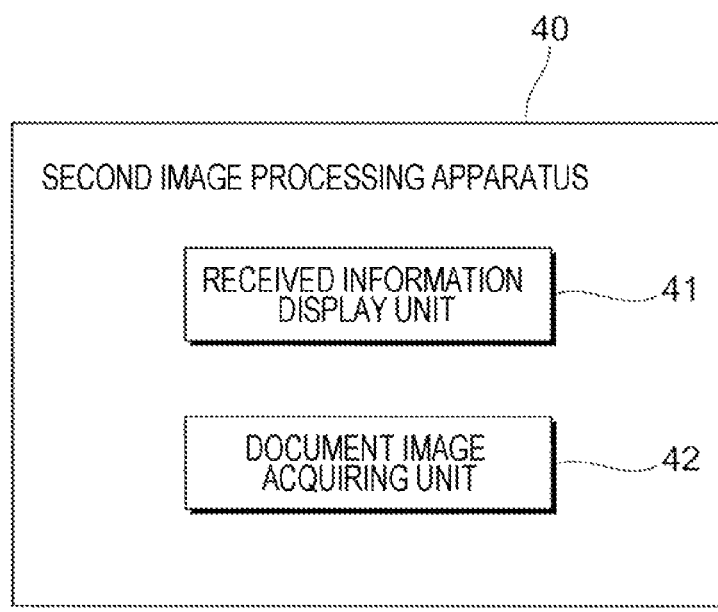
FIG. 8 is a functional block diagram of the second image processing apparatus of the exemplary embodiment 1.

FIG. 8 is a functional block diagram of the second image processing apparatus 40 of the exemplary embodiment 1.

As illustrated in FIG. 8, the second image processing apparatus 40 includes a received information display unit 41 that causes information related to the document transmission/reception service to be displayed, and a document image acquiring unit 42 that acquires a document image.

The received information display unit 41 causes the UI unit 110 to display various messages for the present service. For example, when there is a document image that has not been received, the received information display unit 41 displays a notification indicating the existence of the document image that has not been received, to the recipient who is logging in to the second image processing apparatus 40.

In addition, when a direct mail has been transmitted, the received information display unit 41 causes the UI unit 110 to display the reception of the direct mail. In the exemplary embodiment 1, a recipient may select whether to print the direct mail. Accordingly, the received information display unit 41 performs a display for confirming from a recipient whether to print the direct mail, in addition to displaying the reception of the direct mail.

When the printing time limit has been set for a document image, the received information display unit 41 displays the existence of the document image for which the printing expiration period has been set. For example, when a predetermined printing expiration period has been set for a direct mail, the received information display unit 41 displays the printing time limit of the direct mail, in addition to the reception of the direct mail.

The document image acquiring unit 42 acquires the document image that has been transmitted to the recipient who is logging in, from the management server 30. Then, the document image acquiring unit 42 causes the acquired image to be printed in the image forming unit 118.

Subsequently, specific descriptions will be made on the condition setting screen 90 for specifying a recipient or a recipient side machine of a direct mail.

FIG. 9 is a view of an example of the condition setting screen of the exemplary embodiment 1.

The condition setting screen 90 is displayed by pressing the DM setting button 84 which has been described above with reference to FIGS. 5A and 5B.

Figure 9A:
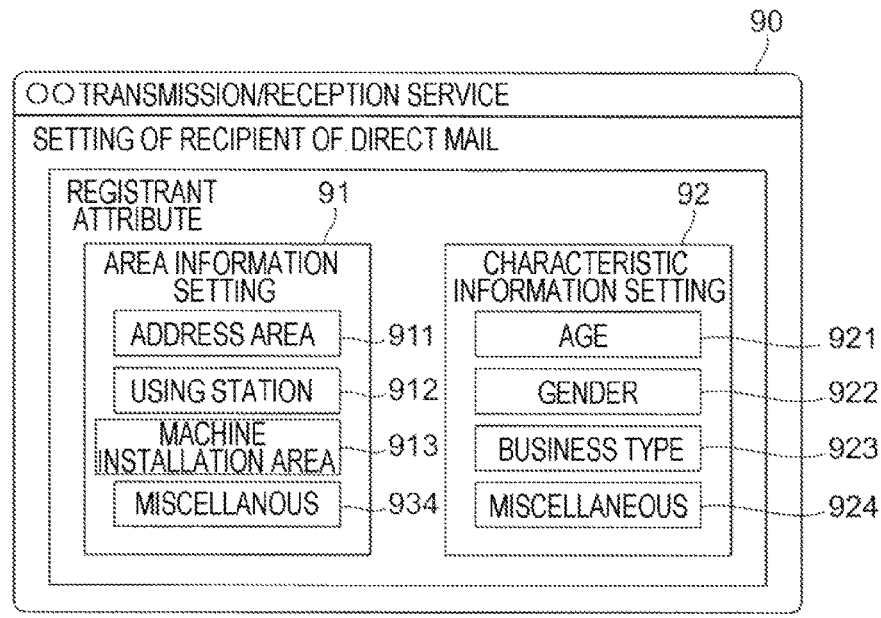
FIGS. 9A and 9B are views illustrating an example of a condition setting screen of the exemplary embodiment 1.
Figure 9B:
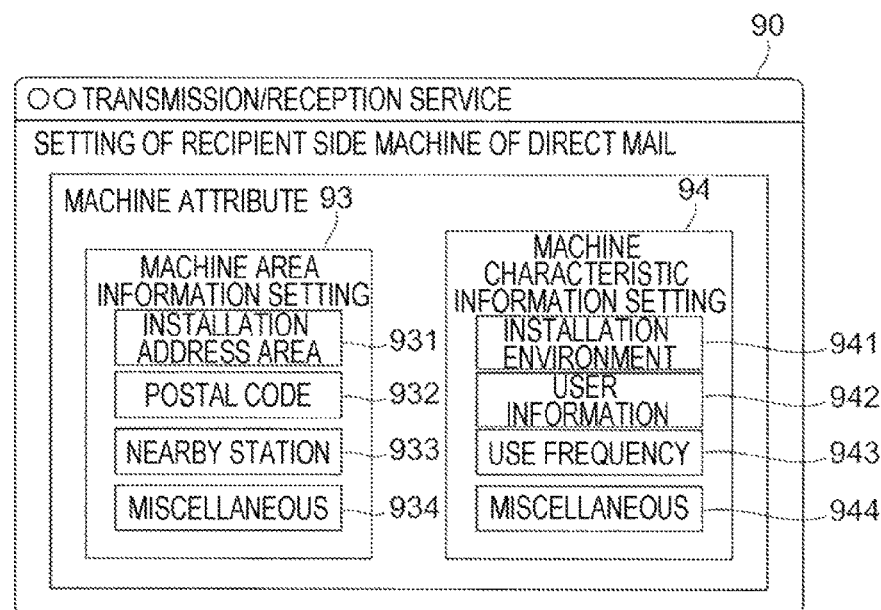

As illustrated in FIG. 9A, the condition setting screen is configured by a screen displayed with a title of "Registrant Attribute" to set conditions of a recipient who receives a direct mail, based on an registrant attribute of an individual or a company. In addition, as illustrated in FIG. 9B, the condition setting screen 90 is configured by a screen displayed with a title of "Machine Attribute" to set a recipient side machine (the second image processing apparatus 40) that receives a direct mail.

As illustrated in FIG. 9A, the screen for setting conditions of a recipient who receives a direct mail includes an area information setting section 91 for setting an area attribute as a condition, and a characteristic information setting section 92 for setting characteristic information as a condition.

The area information setting section 91 includes an address area button 911, a using station button 912, a machine installation area button 913, and a miscellaneous button 914 for displaying other options to set area information of a recipient as a condition.

The address area button 911 is a button for setting an address of a service registrant (see FIG. 7A) as a condition. When the address area button 911 is pressed, the screen transitions to a screen for inputting an address. By inputting specific area information on the screen, a registrant whose an address matches the input area is selected as a recipient.

In this case, an address required to transmit a direct mail may not specify the entire address of a service registrant. For example, where a specific address exists as, for example, "O prefecture, O city, street number O, house number O," an address required to be input is "O prefecture, O city," rather than the entire address including "street number O, house number O."

In addition, when the address area button 911 is pressed, a map may be displayed on the screen, and an address of a service registrant as a destination of a direct mail may be set based on an operation on the map.

The using station button 912 is a button for setting a using station of a service registrant (see FIG. 7A) as a condition. When the using station button 912 is pressed, the screen transitions to a screen for inputting a station. By inputting a specific station on the screen, a service registrant whose using station is the input station is selected as a recipient.

The machine installation area button 913 is a button for setting a designated machine installation address (see FIG. 7A) as a condition. When the machine installation area button 913 is pressed, the screen transitions to a screen for inputting an address. By inputting specific area information on the screen, a service registrant who designates the second image processing apparatus 40 matching the input area as a designated machine is selected as a recipient.

The characteristic information setting section 92 includes an age button 921, a gender button 922, a business type button 923, and a miscellaneous button 924 for displaying other options to set characteristic information of a recipient as a condition.

The age button 921 is a button for setting an age of a service registrant (see FIG. 7A) as a condition. When the age button 921 is pressed, the screen transitions to a screen for inputting an age. By inputting a specific age on the screen, a service registrant matching the input age is selected as a recipient. At this time, the age to be input may be, for example, an age range such as thirties.

The gender button 922 is a button for setting the gender of a service registrant (see FIG. 7A) as a condition. When the gender button 922 is pressed, the screen transitions to a screen for inputting the gender. By inputting the gender on the screen, a service registrant matching the input gender is selected as a recipient.

The business type button 923 is a button for setting a business type (see FIG. 7B) of a service registrant such as a company as a condition. When the business type button 923 is pressed, the screen transitions to a screen for inputting a business type. By inputting a business type on the screen, a service registrant (e.g., a company) matching the input business type is selected as a recipient.

As illustrated in FIG. 9B, the screen for setting conditions of a recipient side machine that receives a direct mail displays a machine area information setting section 93 for setting an area attribute of a recipient side machine as a condition, and a machine characteristic information setting section 94 for setting characteristic information of a recipient side machine as a condition.

The machine area information setting section 93 includes an installation address area button 931, a postal code button 932, a nearby station button 933, and a miscellaneous button 934 for setting area information of a recipient side machine which is a destination as a condition.

The installation address area button 931 is a button for setting an installation address (see FIG. 7C) of a recipient side machine as a condition. When the installation address area button 931 is pressed, the screen transitions to a screen for inputting an address. By inputting specific area information on the screen, the second image processing apparatus 40 matching the input area is selected as a recipient side machine.

The postal code button 932 is a button for setting a postal code (see FIG. 7C) of a recipient side machine as a condition. When the postal code button 932 is pressed, the screen transitions to a screen for inputting a postal code. By inputting specific area information on the screen, the second image processing apparatus 40 installed in, for example, a building matching the input postal code is selected as a recipient side machine.

The nearby station button 933 is a button for setting a nearby station (see FIG. 7C) of a recipient side machine as a condition. When the nearby station button 933 is pressed, the screen transitions to a screen for inputting a station. By inputting a specific station on the screen, the second image processing apparatus 40 installed in, for example, a building of which a nearby station is the input station is selected as a recipient side machine.

The machine characteristic information setting section 94 includes an installation environment button 941, a user information button 942, a use frequency button 943, and a miscellaneous button 944 for setting characteristic information of a recipient side machine which is a destination as a condition.

The installation environment button 941 is a button for setting an installation environment (see FIG. 7C) of a recipient side machine as a condition. When the installation environment button 941 is pressed, the screen transitions to a screen for inputting an installation environment. By inputting a specific installation environment on the screen, the second image processing apparatus 40 matching the input installation environment is selected as a recipient side machine.

The user information button 942 is a button for setting user information of a user (see FIG. 7C) using a recipient side machine as a condition. When the user information button 942 is pressed, the screen transitions to a screen for inputting user information. By inputting specific user information on the screen, the second image processing apparatus 40 matching the input user information is selected as a recipient side machine.

The use frequency button 943 is a button for setting a use frequency (see FIG. 7C) of a recipient side machine as a condition. When the use frequency button 943 is pressed, the screen transitions to a screen for inputting a use frequency. By inputting a use frequency on the screen, the second image processing apparatus 40 matching the input use frequency is selected as a recipient side machine.

As described above, a recipient or a recipient side machine meeting various conditions is set as a destination of a direct mail. At this time, each condition may be a single condition or a combination of plural conditions. In addition, the conditions are not limited to the above-described examples, and other various conditions may be set.

[Operation Flow of Transmitting/Receiving System]

Subsequently, descriptions will be made on an example where a sender transmits a document image as a direct mail to a recipient from the first image processing apparatus 20 through the terminal device 10. Here, the sender uses the first image processing apparatus 20 installed in, for example, an office as a sender side device. In addition, it is assumed that the recipient uses the second image processing apparatus installed in a convenience store as a recipient side machine.

Figure 10:
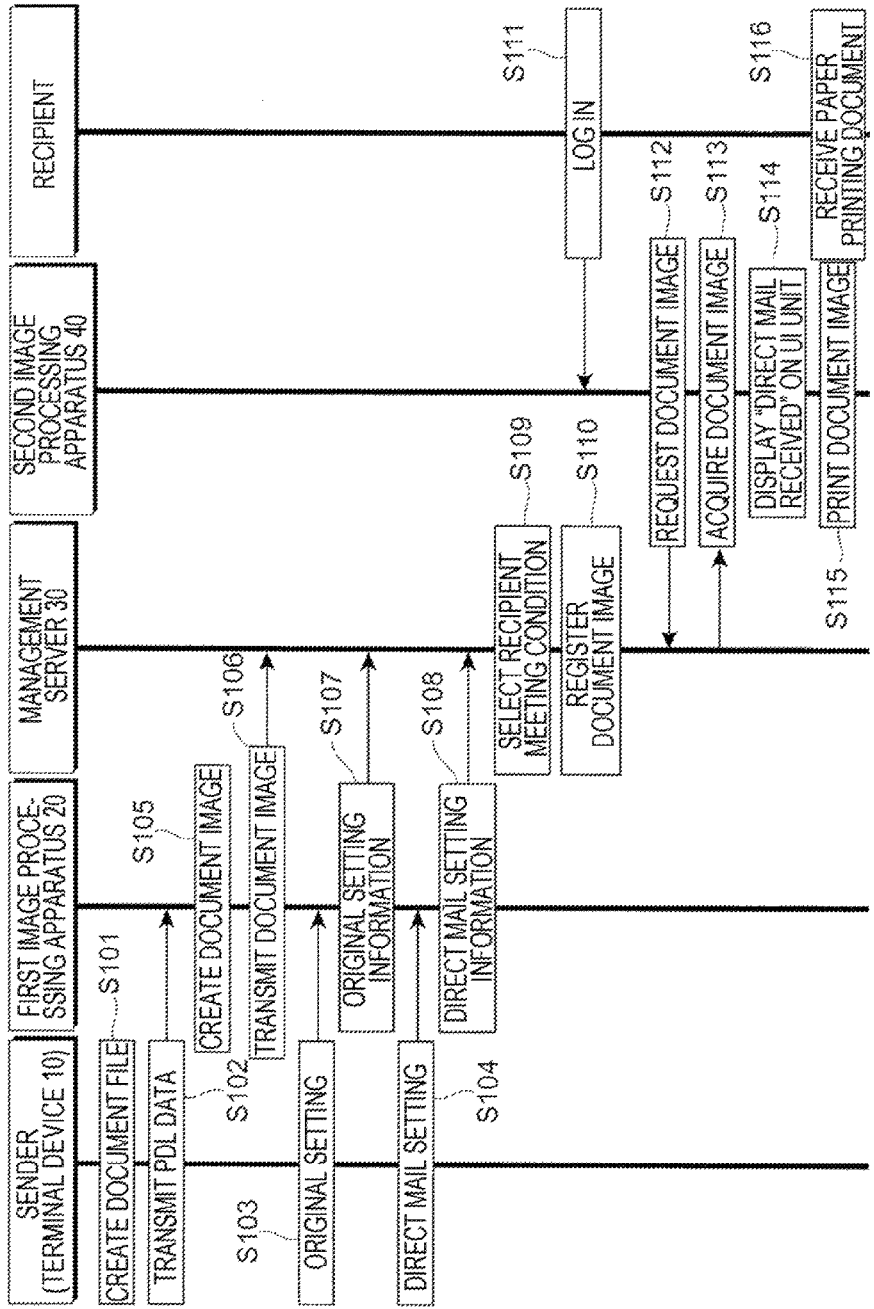
FIG. 10 is an exemplary operation flow of the document transmitting/receiving system of the exemplary embodiment 1.

FIG. 10 is an exemplary operation flow of the document transmitting/receiving system of the exemplary embodiment 1.

As illustrated in FIG. 10, the sender creates a document file such as a letter in the terminal device 10 (step (hereinafter, referred to as "S") 101). Then, the sender performs an operation to send the document to the recipient on the send screen (see FIGS. 5A and 5B) displayed on the display mechanism 100*d* of the terminal device 10. Then, the terminal device 10 creates PDL data of the document file and transmits the PDL data to the first image processing apparatus 20 (S102).

In the sending operation, the sender performs the original setting for a paper printing document (S103). Further, the sender performs the setting of a direct mail for specifying the recipient to whom the direction mail is to be transmitted (S104). As a specific example, the sender sets, for example, "OO prefecture, OO district" which is area information of an individual attribute, as a condition.

Then, the first image processing apparatus 20 creates a document image based on the acquired PDL data (S105). In addition, the first image processing apparatus 20 transmits the document image to the management server 30 (S106).

Then, the first image processing apparatus 20 transmits the original setting information to the management server 30 (S107). Further, the first image processing apparatus 20 transmits the direct mail setting information to the management server 30 (S108).

Then, based on the pre-stored registered information of the present service and the received direct mail setting information, the management server 30 selects a recipient who meets the condition as a destination of the direct mail (S109). In this example, plural service registrants each whose address is "OO prefecture, OO district" are selected as recipients of the direct mail.

In addition, the management server 30 registers the document image (S110). In registering the document image, for example, storing the document image, designating a destination for the stored document image, and registering an identification information image are performed. Meanwhile, when a printing time limit has been set for the direct mail, the printing time limit of the direct mail is registered in registering the document image.

Meanwhile, for example, a recipient whose address is "OO prefecture, OO district, street number O, house number O" performs a log-in authentication to the second image processing apparatus 40 installed in a convenience store (S111). Thereafter, the second image processing apparatus 40 requests the management server 30 to transmit the document image that has been transmitted to the recipient who is logging in (S112).

In this example, the recipient who has logged in corresponds to a destination of the direct mail. Accordingly, the management server 30 transmits the document image as the direct mail to the second image processing apparatus 40 to which the recipient is logging in. Then, the second image processing apparatus 40 acquires the document image as the direct mail from the management server 30 (S113). Here, when the document image acquired from the management server 30 is a direct mail, the UI unit 110 of the second image processing apparatus 40 displays a text message indicating that the direct mail is being received, such as "Direct Mail Received" (S114).

Then, the second image processing apparatus 40 prints the document image (S115). Accordingly, the recipient receives a paper printing document (the direct mail) (S116).

Here, in the exemplary embodiment 1, when the direct mail is printed by the recipient, a fee for the transmission/reception of the direct mail is charged to the sender of the direct mail.

As described above, in the above-described example, when addresses of service registrants who login to the second image processing apparatus 40 meets the condition of "OO prefecture, OO district," the direct mail having the same contents is collectively transmitted to the plural recipients who meet the condition. That is, in the document transmitting/receiving system 1 of the exemplary embodiment 1, for example, the direct mail is collectively transmitted to recipients even though the sender does not entirely specify the address of each recipient.

In the exemplary embodiment 1, when the UI unit 110 displays "Direct Mail Received" in S114, it may be confirmed from the recipient whether to print the direct mail. When the recipient accepts to print the direct mail, the direct mail is printed, and when the recipient refuses to print the direct mail, the direct mail may not be printed.

Meanwhile, as another example, a direct mail may be set to be forcibly printed from a recipient side machine, for example, when performing the setting for transmitting a direct mail. This setting may be performed by a sender or a recipient of the direct mail.

<Exemplary Embodiment 2>

Subsequently, a document transmitting/receiving system 1 of an exemplary embodiment 2 will be described. In the exemplary embodiment 2, the same components as those in the exemplary embodiment 1 will be denoted by the same reference numerals as used in the exemplary embodiment 1, and detailed descriptions thereof will be omitted.

Figure 11:
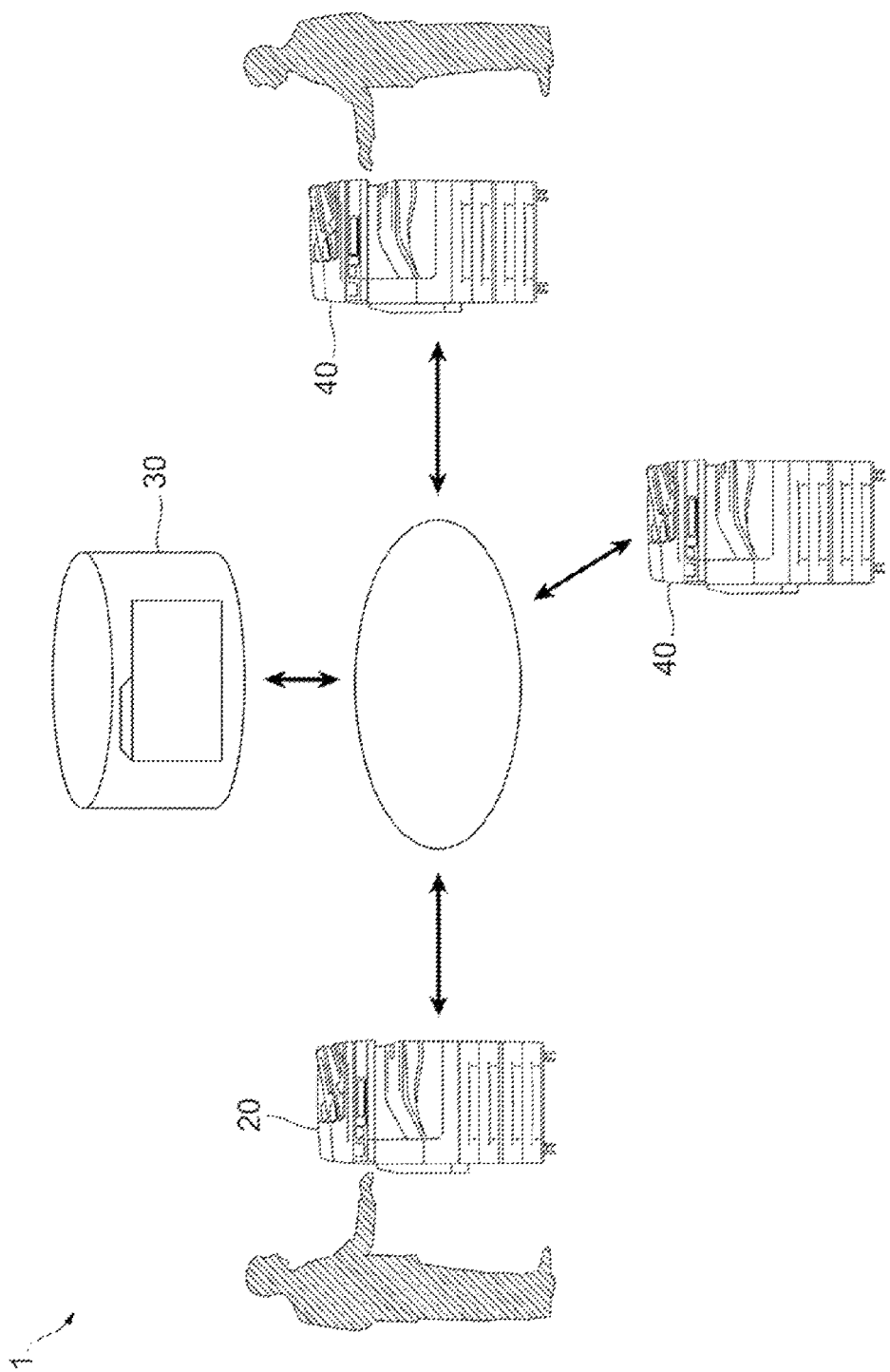
FIG. 11 is a view illustrating an exemplary configuration of a document transmitting/receiving system of an exemplary embodiment 2.

FIG. 11 is a view illustrating an exemplary configuration of the document transmitting/receiving system 1 of the exemplary embodiment 2.

As illustrated in FIG. 11, the document transmitting/receiving system 1 includes the first image processing apparatus 20, the management server 30, and the plural second image processing apparatuses 40. In the exemplary embodiment 2, the sender side machine is the first image processing apparatus 20, and the recipient side machine is the second image processing apparatuses 40.

In the exemplary embodiment 2, it is assumed that the first image processing apparatus 20 is directly operated without the terminal device 10 which is used in the exemplary embodiment 1. For example, a case where the first image processing apparatus 20 is installed in, for example, a convenience store may be taken into account.

A sender transmits a document image by directly operating the first image processing apparatus 20. Specifically, the sender causes a document to be read by the image reading unit 119 of the first image processing apparatus 20 or document data recorded in a recording medium to be read by the first image processing apparatus 20. Thereafter, the document transmitting unit 21 of the first image processing apparatus 20 creates a direct mail based on the document data.

In the exemplary embodiment 2, the UI unit 110 displays the send screen (see FIG. 5B). Then, the sender sets conditions for a recipient of the direct mail (see FIGS. 9A and 9B) or a time limit for the direct mail on the screen of the UI unit 110.

As described above, the direct mail is transmitted from the first image processing apparatus 20 to the management server 30. Thereafter, a recipient who is a destination prints the direct mail in the second image processing apparatus 40 so that the direct mail is received by the recipient.

<Exemplary Embodiment 3>

Subsequently, a document transmitting/receiving system 1 of an exemplary embodiment 3 will be described. In the exemplary embodiment 3, the same components as those in the exemplary embodiment 1 will be denoted by the same reference numerals as used in the exemplary embodiment 1, and detailed descriptions thereof will be omitted.

Figure 12:
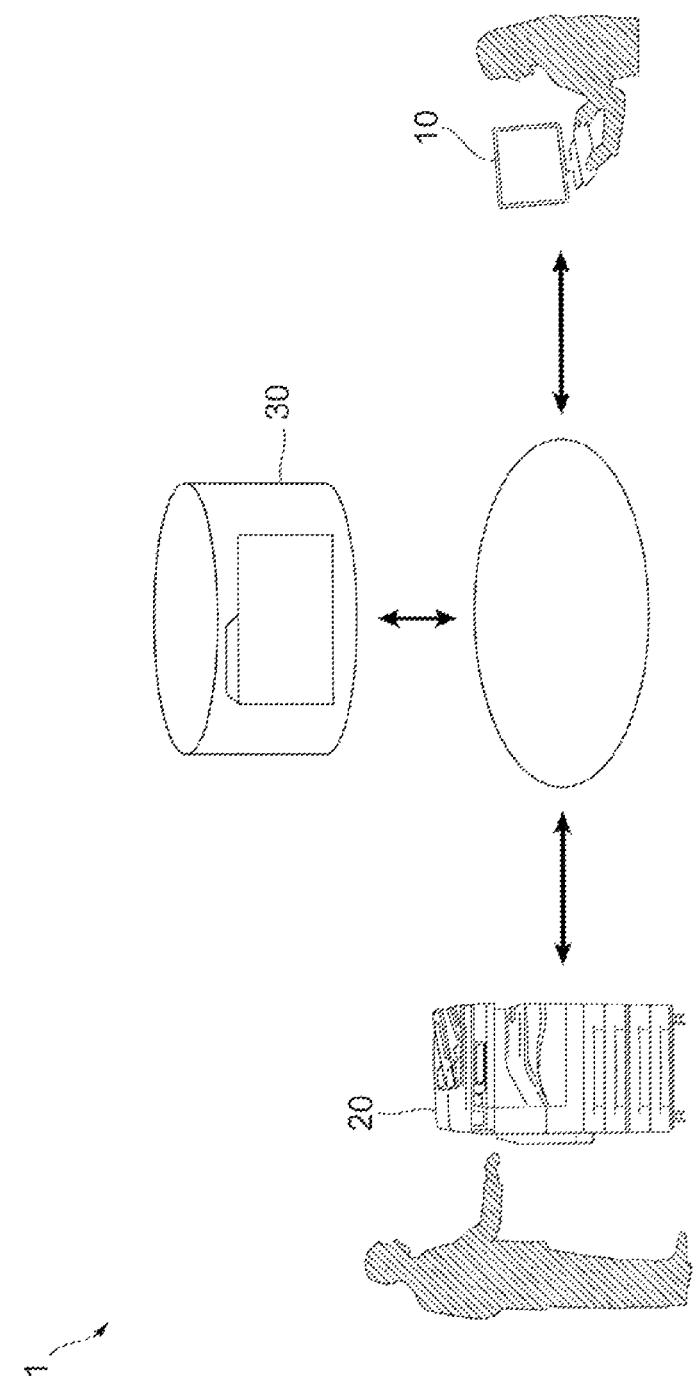
FIG. 12 is a view illustrating an exemplary configuration of a document transmitting/receiving system of an exemplary embodiment 3.

FIG. 12 is a view illustrating an exemplary configuration of the document transmitting/receiving system 1 of the exemplary embodiment 3.

As illustrated in FIG. 12, the document transmitting/receiving system 1 includes the first image processing apparatus 20, the management server 30, and the terminal device 10. In the exemplary embodiment 3, the sender side machine is the first image processing apparatus 20, and the recipient side machine is the terminal device 10.

In the exemplary embodiment 3, a sender transmits a document image by directly operating the first image processing apparatus 20. Specifically, the sender causes a document to be read by the image reading unit 119 of the first image processing apparatus 20 or document data recorded in a recording medium to be read by the first image processing apparatus 20. Thereafter, the document transmitting unit 21 of the first image processing apparatus 20 creates a document image based on the document data.

Meanwhile, a recipient logs in to the document transmitting/receiving system 1 through the terminal device 10. Then, the terminal device 10 downloads the document image such as the direct mail and outputs the document image as an electronic file such as portable document format (PDF).

As described above, in the exemplary embodiment 3, the document data is transmitted from the first image processing apparatus 20 to the management server 30. Thereafter, the recipient outputs the document data in, for example, the terminal device 10 so that the electronic file of the document data (the direct mail) is received by the recipient.

In the exemplary embodiments 1 to 3, the configurations of the functional units to implement the transmission/reception service in the terminal device 10, the first image processing apparatus 20, the management server 30, and the second image processing apparatus 40 are not limited to the above-described aspects of the exemplary embodiments. For example, the management server 30 may not store the document image, and the second image processing apparatus 40 may acquire the document image or the PDL data stored in the first image processing apparatus 20 according to necessity.

In the exemplary embodiments 1 to 3, the management server 30 is caused to transmit the document image of the document file. However, instead of the document image, PDL data of the document file may be transmitted.

A program which causes a computer to implement the functions of the respective components in the present exemplary embodiments may be provided, for example, by a communication unit or in a state of being stored in various recording media.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
a plurality of printing units configured to receive and print document data;
a memory configured to store attribute information of a recipient of the document data, the attribute information including identification information of a printing unit from among the plurality of printing units designated by the recipient; and
a processor configured to execute a transmitting unit configured to, in response to receiving the document data and recipient data from a sender, transmit the document data to the printing unit designated by the recipient specified in the recipient data,
wherein the document data includes time limit information including a predetermined time period,
wherein the printing unit designated by the recipient is configured to, in response to a request by the recipient being received within the predetermined time period, print the document data,
wherein the printing unit designated by the recipient is configured to, in response to the request by the recipient not being received within the predetermined time period, refrain from printing the document data,
wherein the document data further includes an originality assurance image and a predetermined number of allowed original printing operations,
wherein the printing unit designated by the recipient is configured to, in response to the number of prints of the document data not exceeding the predetermined number of allowed original printing operations, print the document data and the originality assurance image, and
wherein the printing unit designated by the recipient is configured to, in the response to the number of prints of the document data exceeding the predetermined number of allowed original printing operations, print the document data without printing the originality assurance image.

2. The system according to claim 1, wherein the attribute information of the recipient further includes information related to an area of the recipient.

3. The system according to claim 1, wherein the attribute information of the recipient further includes information of an area where the printing unit designated by the recipient is installed.

4. The system according to claim 1, wherein the processor is further configured to execute:
a fee charging unit configured to charge a fee to a sender who has transmitted the document data, based on the printing of the document data by the printing unit.

5. The system according to claim 1, wherein the recipient data includes at least one from among an address, a postal code, a using station, a recipient age, a recipient gender, a recipient academic history, a recipient hospital history, a recipient hobby, identification information of a printing apparatus from among the plurality of printing apparatuses, an installation address of a printing apparatus from among the plurality of printing apparatuses, a recipient use frequency, a business type, and a number of employees of the recipient.

6. The system according to claim 5, wherein the transmitting unit is configured to transmit the document data to printing units corresponding to all recipients from among the plurality of recipients whose attribute information matches the received recipient data.

7. A server device comprising:
a memory configured to store attribute information of a recipient of document data, the attribute information including identification information of a printing unit from among a plurality of printing units designated by the recipient; and
a processor configured to execute a transmitting unit configured to, in response to receiving the document data and recipient data from a sender, transmit the document data to the printing unit designated by the recipient specified in the recipient data,
wherein the document data includes time limit information including a predetermined time period,
wherein the printing unit designated by the recipient is configured to, in response to a request by the recipient being received within the predetermined time period, print the document data,
wherein the printing unit designated by the recipient is configured to, in response to the request by the recipient not being received within the predetermined time period, refrain from printing the document data,
wherein the document data further includes an originality assurance image and a predetermined number of allowed original printing operation,
wherein the printing unit designated by the recipient is configured to, in response to the number of prints of the document data not exceeding the predetermined number of allowed original printing operations, print the document data and the originality assurance image, and
wherein the printing unit designated by the recipient is configured to, in response to the number of prints of the document data exceeding the predetermined number of allowed original printing operations, print the document data without printing the originality assurance image.

8. The server device according to claim 7, wherein the recipient data includes at least one from among an address, a postal code, a using station, a recipient age, a recipient gender, a recipient academic history, a recipient hospital history, a recipient hobby, identification information of a printing apparatus from among the plurality of printing apparatuses, an installation address of a printing apparatus from among the plurality of printing apparatuses, a recipient use frequency, a business type, and a number of employees of the recipient.

9. The system according to claim 8, wherein the transmitting unit is configured to transmit the document data to printing units corresponding to all recipients from among the plurality of recipients whose attribute information matches the received recipient data.

10. A document transmitting and receiving system comprising:
a plurality of printing apparatuses; and
a server configured to store attribute information regarding a plurality of recipients of document data, the attribute information including information mapping the plurality of recipients to the plurality of printing apparatuses, wherein each recipient is mapped to a designated printing apparatus,
wherein the server is configured to, in response to receiving document transmitting information which includes document data and recipient information, transmit the document data to the designated printing apparatus corresponding to at least one recipient based on the recipient information,
wherein the document transmitting information includes time limit information including a predetermined time period,
wherein the designated printing apparatus is configured to, in response to a request by the recipient being received within the predetermined time period, print the document data, and
wherein the designated printing apparatus is configured to, in response to the request by the recipient not being received within the predetermined time period, refrain from printing the document data,
wherein the document transmitting information further includes an originality assurance image and a predetermined number of allowed original printing operations,
wherein the designated printing apparatus is configured to, in response to the number of prints of the document data not exceeding the predetermined number of allowed original printing operations, print the document data and the originality assurance image, and
wherein the designated printing apparatus is configured to, in response to the number of prints of the document data exceeding the predetermined number of allowed original printing operations, print the document data without printing the originality assurance image.

11. The document transmitting and receiving system according to claim 10, wherein the recipient information includes at least one from among an address, a postal code, a using station, a recipient age, a recipient gender, a recipient academic history, a recipient hospital history, a recipient hobby, identification information of a printing apparatus from among the plurality of printing apparatuses, an installation address of a printing apparatus from among the plurality of printing apparatuses, a recipient use frequency, a business type, and a number of employees of the recipient.

12. The document transmitting and receiving system according to claim 11, wherein the server is configured to transmit the document data to the designated printing apparatus corresponding to all recipients from among the plurality of recipients whose attribute information matches the recipient information received by the server.

* * * * *